W. H. PHILLIPS.
CONDENSER.
APPLICATION FILED JULY 31, 1920.

1,397,545.

Patented Nov. 22, 1921.

Inventor
Will H. Phillips
By his Attorneys

UNITED STATES PATENT OFFICE.

WILL H. PHILLIPS, OF CHICAGO, ILLINOIS, ASSIGNOR TO WORTHINGTON PUMP AND MACHINERY CORPORATION, A CORPORATION OF VIRGINIA.

CONDENSER.

1,397,545.      Specification of Letters Patent.      Patented Nov. 22, 1921.

Application filed July 31, 1920. Serial No. 400,542.

*To all whom it may concern:*

Be it known that I, WILL H. PHILLIPS, a citizen of the United States, residing at Chicago, county of Cook, and State of Illinois, have invented certain new and useful Improvements in Condensers, fully described and represented in the following specification and the accompanying drawings, forming a part of the same.

This invention relates to surface condensers and has for its object the provision of a cheap, compact and efficient strainer construction within the condenser, and further to provide for keeping the strainer clean by reverse flow of the inlet and discharge water in multiple pass condensers.

In the accompanying drawing forming a part of this specification a surface condenser embodying all the features of the invention in their preferred form is shown and this construction will now be described in detail and the features forming the invention then specifically pointed out in the claims.

In the drawings—

Figure 1:
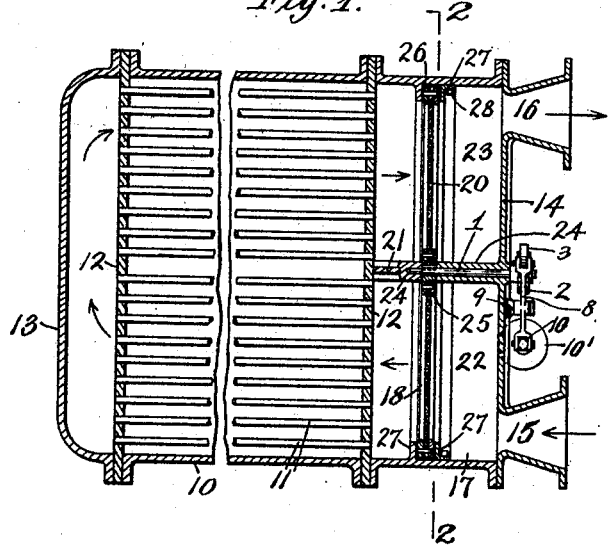
Figure 1 is a vertical section through the condenser.
Figure 2:
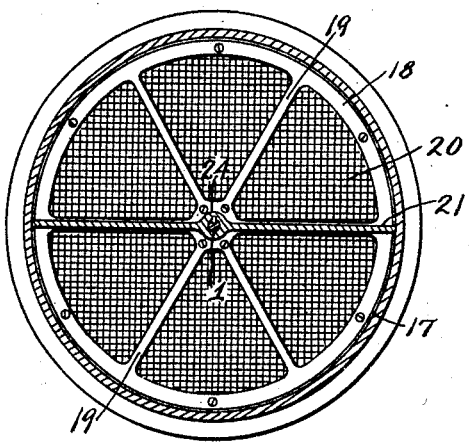
Fig. 2 is a section on the line 2—2 of Fig. 1.

Referring to the drawing, the two-pass surface condenser shown by way of illustration, has the usual steam chamber 10, tubes 11, tube plates 12, a return flow head 13 at one end and at the other end head 14 having inlet connection 15 and outlet connection 16.

Between head 14 and the corresponding tube plate 12 I provide means for straining the circulating water, and this means may advantageously be of the form shown, in which chamber 17 contains a strainer 18 of wheel form with spokes 19 supporting the screen 20. The partition 21 which divides the chamber 17 into inlet chamber 22 and discharge chamber 23 has hollow hubs 24 receiving shaft 1 carrying strainer 18 on hubs 25. The rim 26 of strainer 18 rotates between two annular flanges 27 carried by the wall of chamber 17, one of the flanges being shown as removable by bolts 28, for inserting and removing the strainer.

I provide actuating means, outside the chamber 17, for rotating the strainer, preferably step by step, which may advantageously be of the form shown, as follows: Shaft 1 is provided with wheel 2 outside the head 14, engaged by a pawl 3 which is moved by a lever 8 mounted in bracket 9. The lever is rocked by the piston rod 10 of a compressed air cylinder 10', but other means may be used.

The operation of the device is as follows: The circulating water delivered by suitable means to the inlet connection 15 passes through inlet chamber 22 and strainer 18. The water then passes through the lower pass of tubes to the return flow head 13 by which it is directed to the upper pass of tubes and discharge chamber 23. In passing through discharge chamber 23 the water again passes through the strainer 18, but in a reverse direction, and this reverse flow cleans the strainer 18 of solid matter deposited by the inlet flow. The rotation of the strainer brings all parts successively into inlet and discharge flow position and thus keeps the strainer clean.

What I claim is:

1. The combination with a surface condenser and its circulating water inlet chamber, of a rotatable strainer extending over and inclosed within the chamber, and means for rotating the strainer.

2. The combination with a surface condenser and its circulating water inlet chamber, of a rotatable strainer extending over and inclosed within the chamber, and means for producing a step by step rotation of the strainer.

3. The combination with a multiple pass surface condenser and its circulating water inlet and discharge chambers, of a strainer extending across the inlet and discharge chambers, and means for moving the strainer to bring its straining portions successively in the line of inlet and discharge flows.

4. The combination with a multiple pass surface condenser and its circulating water inlet and discharge chambers, of a rotatable strainer extending across the inlet and discharge chambers, and means for rotating the strainer step by step to bring its straining portions successively in the line of inlet and discharge flows.

5. The combination with a multiple pass surface condenser and its circulating water inlet and discharge chambers and partitions, of a rotatable strainer extending across the inlet and discharge chambers, a shaft carrying the strainer and mounted in the partition, a wheel on said shaft, a pawl operating said wheel, and means for actuating the pawl.

6. The combination with a multiple pass surface condenser and its circulating water inlet and discharge chambers and partitions, of a rotatable strainer extending across the inlet and discharge chambers, a shaft carrying the strainer and mounted in the partition, a wheel on said shaft, a pawl operating said wheel, and a motor cylinder and connections for actuating the pawl.

In testimony whereof, I have hereunto set my hand.

WILL H. PHILLIPS.